(12) United States Patent
Kim et al.

(10) Patent No.: US 8,453,168 B2
(45) Date of Patent: May 28, 2013

(54) DISK DRIVE HAVING A TRAY LOCK RELEASING UNIT AND A METHOD OF RELEASING A TRAY LOCK USING THE TRAY LOCK RELEASING UNIT

(75) Inventors: Hag-ryeol Kim, Yongin-si (KR); Hyun-woo Lee, Suwon-si (KR); Young-woo Back, Suwon-si (KR); Sung-hun Lee, Yongin-si (KR)

(73) Assignee: Toshiba Samsung Storage Technology Korea Corporation, Suwon-si ( * ) Notice: Subject to any disclaimer, the term of this patent is extended or adjusted under 35 U.S.C. 154(b) by 0 days.

(21) Appl. No.: 13/295,964

(22) Filed: Nov. 14, 2011

(65) Prior Publication Data

US 2012/0174134 A1 Jul. 5, 2012

(30) Foreign Application Priority Data

Dec. 31, 2010 (KR) ........................ 10-2010-0140686

(51) Int. Cl.
*G11B 17/03* (2006.01)

(52) U.S. Cl.
USPC ....................................... 720/610

(58) Field of Classification Search
USPC ....................................... 720/610
See application file for complete search history.

(56) References Cited

U.S. PATENT DOCUMENTS

| | | | |
|---|---|---|---|
| 5,058,090 A | 10/1991 | Ueno et al. | |
| 6,275,460 B1* | 8/2001 | Nakayama et al. | 720/610 |
| 6,954,936 B2* | 10/2005 | Ahn | 720/610 |
| 7,073,183 B2* | 7/2006 | Hekizono | 720/610 |
| 7,617,506 B2* | 11/2009 | Harada et al. | 720/610 |
| 2004/0117807 A1* | 6/2004 | Takahashi et al. | 720/610 |
| 2006/0161931 A1* | 7/2006 | Chen et al. | 720/610 |
| 2006/0265722 A1* | 11/2006 | Yang et al. | 720/610 |
| 2007/0006240 A1* | 1/2007 | Harada et al. | 720/610 |
| 2007/0028250 A1* | 2/2007 | Chien et al. | 720/610 |
| 2007/0028251 A1* | 2/2007 | Yang et al. | 720/610 |
| 2007/0039013 A1* | 2/2007 | Sun et al. | 720/610 |
| 2008/0082993 A1* | 4/2008 | Harada et al. | 720/610 |

FOREIGN PATENT DOCUMENTS

| | | |
|---|---|---|
| JP | 10-269666 | 10/1998 |
| JP | 2006-012304 | 1/2006 |
| JP | 2006-172557 | 6/2006 |
| KR | 10-0273764 | 9/2000 |
| KR | 10-2012-0078402 | 7/2012 |

* cited by examiner

*Primary Examiner* — Mark Blouin
(74) *Attorney, Agent, or Firm* — NSIP Law

(57) ABSTRACT

A disk drive including a main chassis; a tray on which a disk is to be removably mounted, the tray being installed to slide into/out of the main chassis, and including a pickup transporting unit that is configured to move a pickup base back and forth in a straight line in a radial direction of the disk. The pickup base includes an optical pickup installed thereon, The disk drive also includes a lock releasing unit that is arranged on the tray, is driven by receiving a driving force of the pickup transporting unit, and releases lock of the tray from the main chassis. The disk drive drives a lock releasing unit by using driving force of a pickup transporting unit.

23 Claims, 6 Drawing Sheets

DISK DRIVE HAVING A TRAY LOCK RELEASING UNIT AND A METHOD OF RELEASING A TRAY LOCK USING THE TRAY LOCK RELEASING UNIT

CROSS-REFERENCE TO RELATED PATENT APPLICATION

This application claims the benefit of Korean Patent Application No. 10-2010-0140686, filed on Dec. 31, 2010, in the Korean Intellectual Property Office, the entire disclosure of which is incorporated herein by reference for all purposes.

BACKGROUND

1. Field

The following description relates to a disk drive, and additionally, to a disk drive having a tray lock releasing unit that is driven by driving force of a pickup transporting unit, and a method of releasing tray lock by using the tray lock releasing unit.

2. Description of the Related Art

A disk drive is a device that writes to or reads data from a recording medium. A recording medium includes an optical recording medium such as a compact disc (CD) or a digital versatile disc (DVD), by irradiating light thereto.

A disk drive includes a main chassis, a tray on which a disk is loaded and that slides into/out of the main chassis, and a cover that forms an exterior of the disk drive and protects internal structures and electronic devices enclosed within the main chassis. The tray includes a spindle motor for rotating a disk loaded on the tray, a pickup unit (e.g., an optical pickup unit) for reproducing data from or writing data to a disk, and a pickup transporting unit for moving a pickup base (e.g., an optical pickup base) on which the pickup unit (e.g., the optical pickup unit) is installed. The pickup transporting unit moves the pickup base between an inner circumference and an outer circumference of a disk.

A disk drive includes a locking unit for continuously inserting a tray in the main chassis and a lock releasing unit for separating the tray from the main chassis. A conventional lock releasing unit releases a lock of a tray with respect to a main chassis by using a solenoid. However, such a conventional lock releasing unit requires a separate solenoid. The additional separate solenoid thus increases the amount of space required which thereby increases the size of the disk drive. Further, the additional separate solenoid increases the associated manufacturing costs.

SUMMARY

In one general aspect, there is provided a disk drive. The disk drive includes a main chassis, a tray, on which a disk is to be removably mounted, the tray being installed to slide into/out of the main chassis, and including a pickup transporting unit configured to move a pickup base back and forth in a in a radial direction of the disk, and a lock releasing unit that is arranged on the tray, is driven by receiving a driving force of the pickup transporting unit, and releases a lock of the tray from the main chassis, wherein the pickup base has a pickup unit installed thereon.

The lock releasing unit may include a lock lever unit that is rotatably installed on the tray and that includes a hook that is to be engaged with a locking protrusion which is arranged on the main chassis, a link unit that is rotatably installed on the tray and comprises an interfering unit which receives a driving force from the pickup base, and a connecting unit that is rotatably installed on the tray, is connected to the lock lever unit and the link unit, and rotates the lock lever unit by transferring to the lock lever unit a force that is based on a rotation force that the connecting unit receives from the link unit.

The interfering unit may receive a driving force of the pickup transporting unit by engaging a feeding guide that connects the pickup base to a lead screw.

The pickup transporting unit may include a servo motor and the lead screw, the servo motor may drive the lead screw by transferring a driving force to the lead screw.

The lock releasing unit may include a spring that is fixed to the lock lever unit and the connecting unit and that applies an elastic force in a direction in which the hook is engaged with the locking protrusion.

The disk drive may include a stopper that is arranged on the tray so as to define an initial position of the lock releasing unit, the stopper being arranged so as to engage the link unit in the initial position.

The disk drive may include a position defining unit that defines the initial position of the lock releasing unit, the position defining unit being installed on the connecting unit, and contacting a frame of the tray if the link unit is engaging the stopper.

The lock releasing unit may include a spring that is fixed to the lock lever unit and the connecting unit and applies an elastic force in a direction in which the hook engages the locking protrusion.

The disk drive may include a stopper that is arranged on the tray so as to define an initial position of the lock releasing unit, the stopper being arranged so as to engage the link unit in the initial position.

The disk drive may include a position defining unit that defines the initial position of the lock releasing unit, the position defining unit being installed on the connecting unit, and contacting a frame of the tray if the link unit is engaging the stopper.

The pickup unit may be an optical pickup unit.

The a pickup transporting unit may be configured so as to move the pickup base in a straight line along a radial direction of the disk.

The disk drive may be included in an electronic device.

The electronic device may be one of a portable game console, a portable/personal multimedia player (PMP), a portable lap-top PC, a desktop PC, a game console, a high definition television (HDTV), an optical disc player, and a set top box In another aspect, there is provided a disk drive. The disk drive includes a main chassis, a tray, on which a disk is to be removably mounted, that is installed to slide into/out of the main chassis, the tray including a pickup base, on which an pickup unit is installed, a pickup transporting unit that includes a lead screw, which is rotated by a step motor, and a feeding guide, which connects the lead screw and the pickup base, and a lock releasing unit that is arranged on the tray, is driven by receiving a driving force of the step motor via the feeding guide, and releases a lock of the tray from the main chassis.

The lock releasing unit may include a lock lever unit that is rotatably installed on the tray and that includes a hook that is to be engaged with a locking protrusion which is arranged on the main chassis, a link unit that is rotatably installed on the tray and comprises an interfering unit which engages with the feeding guide, and a connecting unit that is rotatably installed on the tray, is connected to the lock lever unit and the link unit, and rotates the lock lever unit by transferring to the lock lever unit a force that is based on a rotation force that the connecting unit receives from the link unit.

The lock releasing unit may include a spring that is fixed to the lock lever unit and the connecting unit and that applies an elastic force in a direction in which the hook is engaged with the locking protrusion.

The disk drive may include a stopper that is arranged on the tray so as to define an initial position of the lock releasing unit, the stopper being arranged so as to engage the link unit in the initial position.

The disk drive may include a position defining unit that defines the initial position of the lock releasing unit, the position defining unit being installed on the connecting unit, and contacting a frame of the tray if the link unit is engaging the stopper.

The disk drive may include a stopper that is arranged on the tray so as to define an initial position of the lock releasing unit, to stopper being arranged so as to engage the link unit in the initial position.

The disk drive may include a position defining unit that defines the initial position of the lock releasing unit, the position defining unit being installed on the connecting unit, and contacting a frame of the tray if the link unit is engaging the stopper.

The pickup unit may be an optical pickup unit.

In another aspect, there is provided a method of releasing lock of a tray from a main chassis by using a lock releasing unit which comprises a lock lever unit that is rotatably installed on the tray and that includes a hook that is to be combined with a locking protrusion arranged on the main chassis; a link unit that is rotatably installed on the tray and includes an interfering unit which receives driving force from the pickup base; and a connecting unit that is rotatably installed on the tray, is connected to the lock lever unit and the link unit, and rotates the lock lever unit by using a rotation force of the link unit. The method includes driving the pickup base, releasing a lock of the tray from the main chassis, and returning the lock releasing unit to the initial position thereof.

During the step of driving the pickup base, the pickup base may be moved in the outer circumferential direction of the disk by moving a feeding guide operatively connected to the lead screw by driving the step motor and rotating a lead screw connected to the step motor according to a lock releasing signal, During the step of releasing the lock of the tray, the link unit may rotate as the feeding guide engages with the interfering unit, and due to the rotation of the link unit, the connecting unit and the lock lever unit rotate, thereby releasing the hook from the locking protrusion.

During the step of returning the lock releasing unit to the initial position thereof, the lead screw may reversely rotate as the step motor reversely rotates, the feeding guide may be separated from the interfering unit, and the link unit may be returned to the initial position due to recovery of the spring.

Other features and aspects may be apparent from the following detailed description, the drawings, and the claims.

Figure 1:
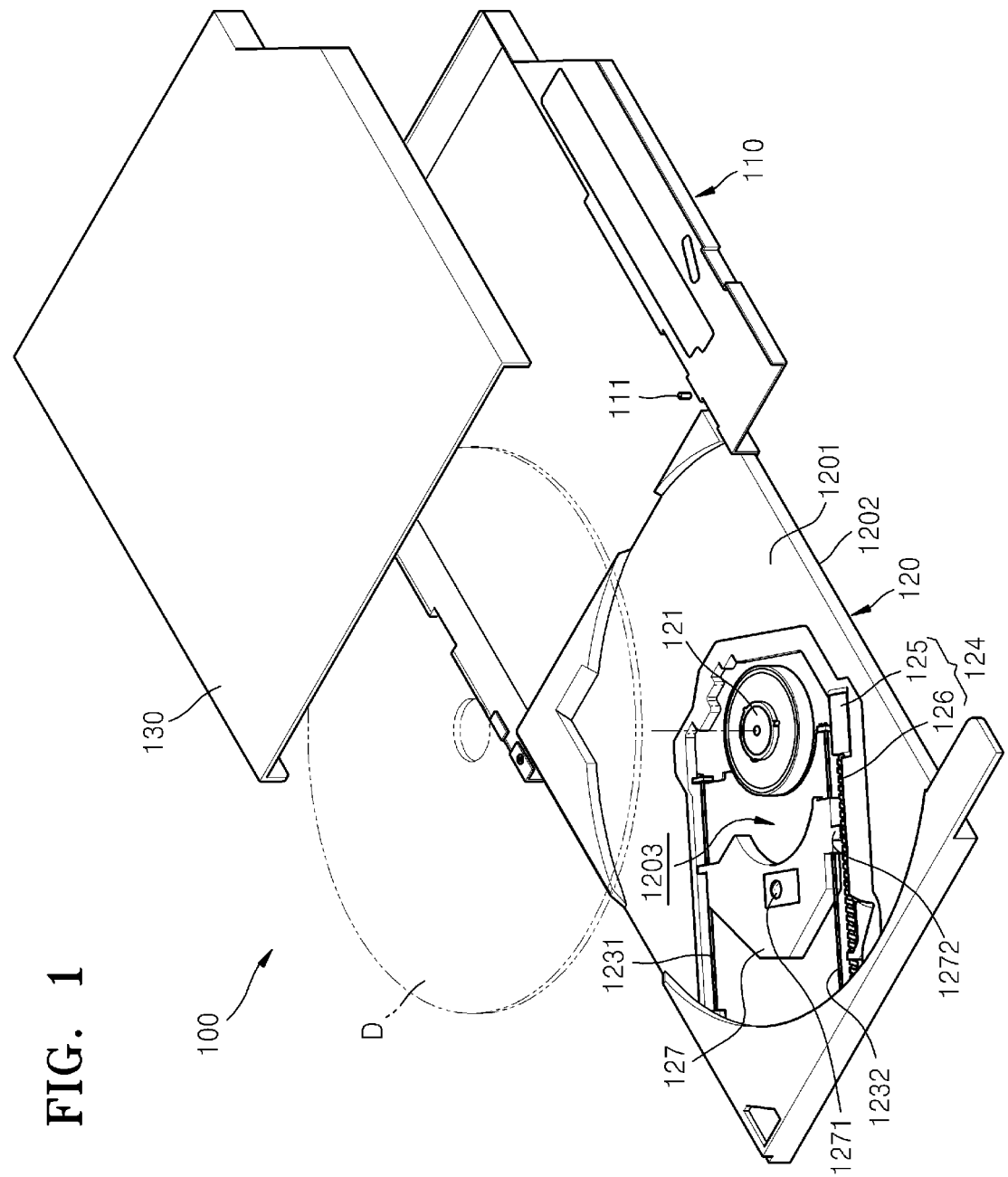
FIG. 1 is a drawing illustrating an example of a disk drive having a lock releasing unit.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
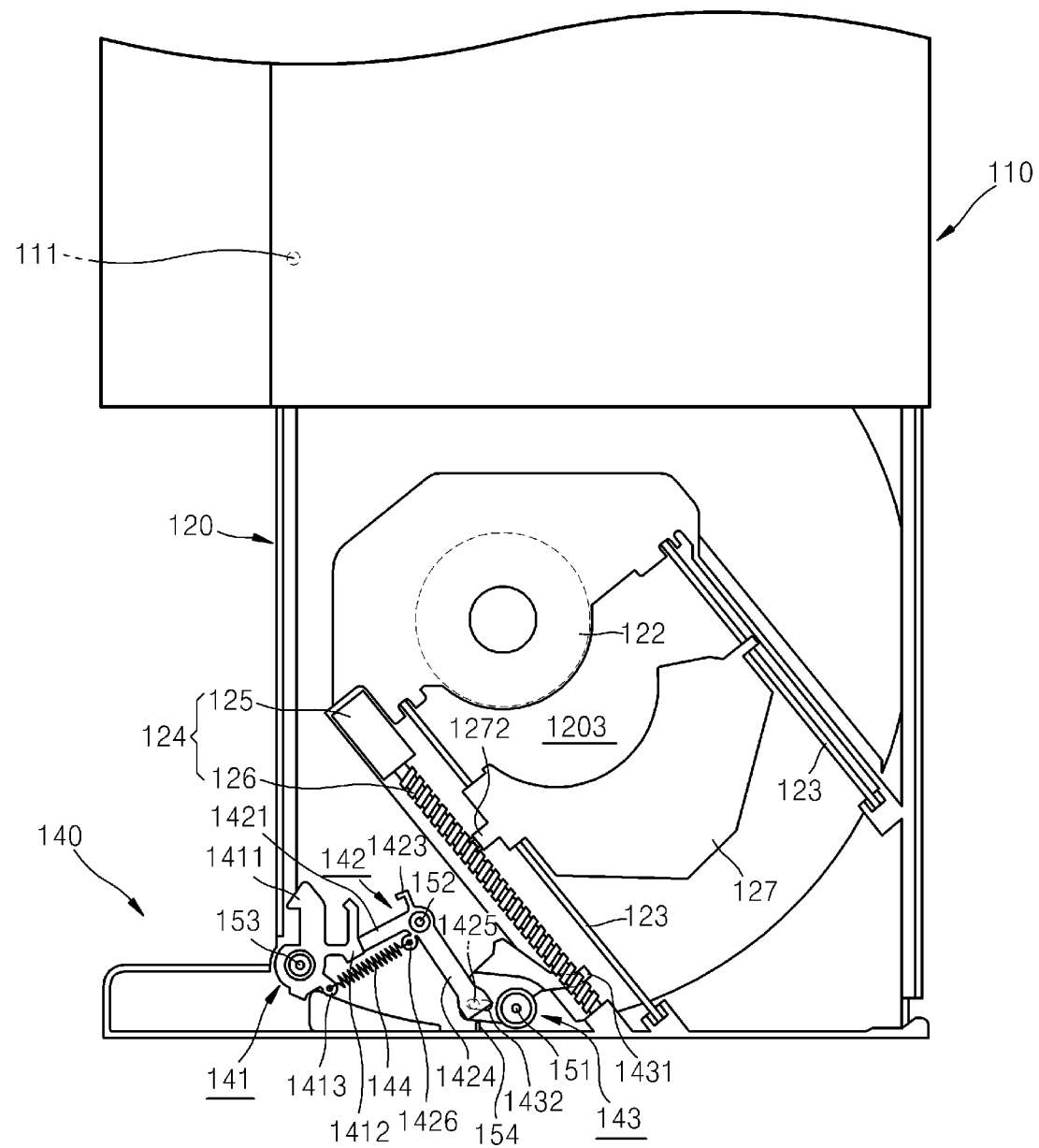
FIG. 2 is a drawing illustrating an example of a bottom side of the disk drive of FIG. 1.
Figure 3:
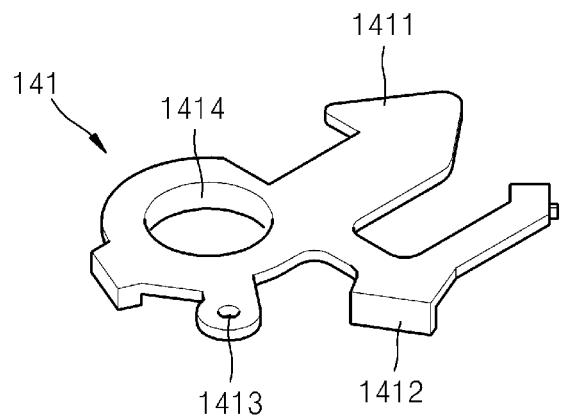
FIG. 3 is a drawing illustrating an example of a lock lever unit of the lock releasing unit shown in FIG. 2.
Figure 4:
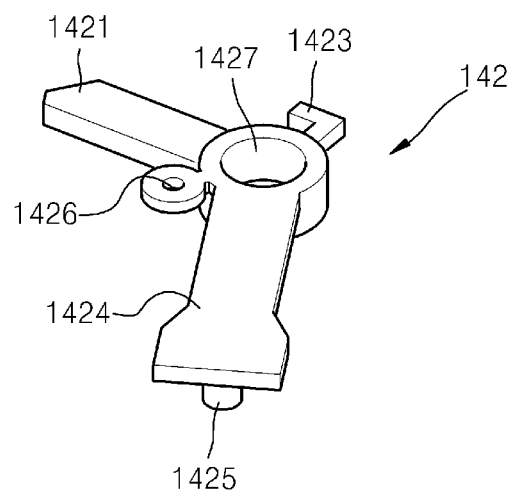
FIG. 4 is a drawing illustrating an example of a connecting unit of the lock releasing unit shown in FIG. 2.
Figure 5:
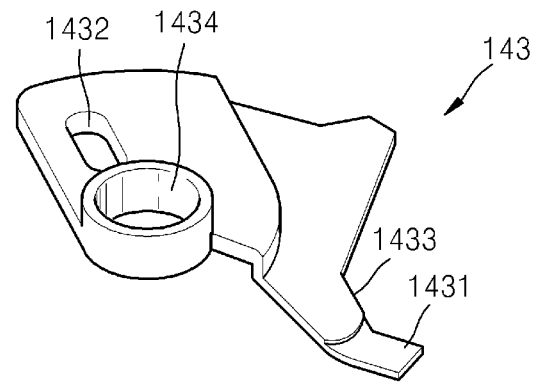
FIG. 5 is a drawing illustrating an example of a link unit of a lock releasing unit.

FIG. 1 is a drawing illustrating an example of a disk drive having a lock releasing unit. FIG. 2 is a drawing illustrating an example of a bottom side of the disk drive of FIG. 1. FIG. 3 is a drawing illustrating an example of a lock lever unit of the lock releasing unit shown in FIG. 2. FIG. 4 is a drawing illustrating an example of a connecting unit of the lock releasing unit shown in FIG. 2. FIG. 5 is a drawing illustrating an example of a link unit of the lock releasing unit shown in FIG. 2.

Referring to FIGS. 1 through 5, a disk drive 100 includes a main chassis 110, a cover 130 that covers a top of the main chassis 110 to form a predetermined space between the cover 130 and the main chassis 110, and a tray 120 that is installed to be able to slide into and out of the main chassis 110 with a disk D mounted thereon. The predetermined spaces between the cover 130 and the main chassis 110 provides sufficient clearance so as to enable the tray 120 to slide into and out of the main chassis 110 with a disk D mounted thereon.

The tray 120 includes a turntable 121 on which the disk D is mounted, and a driving motor 122 that rotates the turntable 121. The tray 120 also includes a pickup base 127 on which a pickup unit 1271 is installed. The pickup unit 1271 writes data to or reads data from the disk D by transmitting a signal to the disk D. For example, the pickup unit 1271 may be an optical pickup unit. As an example, an optical pickup unit writes data to or reads data from a disk D by irradiating light to the disk D. The characteristics of the light may correspond with the data being written to the disk or the data being read from the disk. The tray also includes a plurality of guiding shafts 1231 and 1232 that are arranged a predetermined distance apart from each other so as to guide the pickup base 127 as it moves back and forth in a radial direction relative to the disk D. To enable the pickup base 127 to move back and forth along the guiding shafts 1231 and 1232 in the direction of a radiation direction relative to the disk D, the tray 120 has installed thereon a pickup transporting unit 124 that includes a lead screw 126 and a step motor 125 for rotating the lead screw 126, and a feeding guide 1272 that is arranged on the pickup base 127 and that transmits a rotation force of the lead screw 126 to the pickup base 127. As the lead screw 126 is rotated by the step motor 126, the feeding guide 1272 transmits the rotation force of the screw 126 to the pickup base 127 thereby moving the pickup base 127 in a radial direction relative to the disk D.

As illustrated in FIGS. 2-6, a lock releasing unit 140 is installed on a bottom surface 1202 of the tray 120. The lock releasing unit 140 releases a lock of the tray 120 that holds the tray in an inserted position relative to the main chassis 110. In other words, the lock releasing unit 140 disengages a lock if the tray 120 is inserted into the main chassis 110 and locked in an inserted position. The lock releasing unit 140 may include a lock lever unit 141, a connecting unit 142, and a link unit 143. The lock releasing unit 140 is arranged close to the lead screw 126 and releases lock of the tray 120 in linkage with the lead screw 126.

The lock lever unit 141 is a unit that locks and releases the tray 120 from an inserted position relative to the main chassis 110. The lock lever unit 141 includes a socket 1414 that is formed in the lock lever unit 141. For example, the socket 1414 is formed so as to penetrate through the lock lever unit 141. The socket 1414 is arranged so as to have a rotating shaft 153 disposed on the bottom surface 1202 of the tray 120 inserted therethrough. The rotating shaft 153 may be rotated within the socket 1414. The lock lever unit 141 may also include a hook 1411 that may be operatively interface with a corresponding locking protrusion 111 that protrudes from a rear surface of the main chassis 110. In a locking position, the hook 1411 engages the locking protrusion 111 so as to inhibit or otherwise prevent the tray 120 moving in an ejection direction and thus becoming ejected from the main chassis 110. For example, the hook 1411 may engage the locking protrusion 111 such that a portion of the hook 1411 wraps around the locking protrusion 111. The lock lever unit 141 may include a rotation force receiving unit 1412 that operatively engages the connecting unit 142. The connecting unit 142 transfers a rotation force to the force receiving unit 1412. The tray lock lever unit 141 may also include a spring fixing unit 1413 by which a first end of a spring 144 is fixed. A second end of the spring 144 may be fixed to the connecting unit 142 so as to operatively connect the lock lever unit 141 and the connecting unit 142.

The link unit 143 is a unit that transmits a rotation force and includes a socket 1434 that is formed so as to penetrate through the link unit 143. A rotating shaft 151 which is arranged on the bottom surface 1202 of the tray 120 may be inserted into the socket 1434. As an example, the rotating shaft 151 may be rotated within the socket 1434. The link unit 143 also includes a driving force transmitting unit 1433 that is a protrusion having a predetermined length and a predetermined height to be selectively combined with the lead screw 126, an elongated socket 1432, and an interfering unit 1431 that extends from the link unit 143 by a predetermined length so as to selectively contact the feeding guide 1272. The driving force transmitting unit 1433 and the interfering unit 1431 are formed so as to face the lead screw 126.

The connecting unit 142 is a unit that rotates the lock lever unit 141 by transferring to the lock lever unit 141 a rotation force received from the link unit 143 and includes a socket 1427 that is formed so as to penetrate through the connecting unit 142. A rotating shaft 152 arranged on the bottom surface 1202 of the tray 120 may be inserted in the socket 1427. As an example, the rotating shaft 152 may be rotated within the socket 1427. The connecting unit 142 also includes a first connecting unit 1424 having a connecting protrusion 1425 that is inserted into the elongated socket 1432 of the link unit 143. For example, the connecting protrusion 1425 may protrude from a surface of the connecting unit 142 that extends in a direction perpendicular to a direction in which a hole formed in the connecting unit 142 that forms the socket 1427 extends. In other words, the connecting protrusion 1425 may extend in a direction that is parallel to the direction in which the hole forming the socket 1427 extends. The connecting unit 142 also includes a second connecting unit 1421 that is operatively connected to the rotation force receiving unit 1412 of the lock lever unit 141. The second connecting unit 1421 permits a transfer of rotational force to the lock lever unit 141. The connecting unit 142 includes a connecting unit 1426 by which a second end of the spring 144 is operatively connected. As a non-limiting example, the spring 144 may be operatively connected to the lock lever unit 141 and the connecting unit 142 so as to bias the lock lever 1411 towards a position in which the lock lever 1411 engages the locking protrusion 111. The connecting unit may also include a position defining unit 1423 that defines an initial position of the lock releasing unit 140.

A stopper 154 that is disposed close to the link unit 143 so as to define the initial position of the lock releasing unit 140 is arranged on the bottom surface 1202 of the tray 120. As shown in FIG. 2, when the tray 120 is ejected from the main chassis 110, the lock releasing unit 140 is at its initial position. In the initial position, the link unit 143 engages the stopper 154, and the position defining unit 1423 of the connecting unit 142 engages a frame 155 of the tray 120. Accordingly, the initial position of the lock releasing unit 140 may be defined by the stopper 154 and the position defining unit 1423.

An elastic force is applied to the lock lever unit 141 by the spring 144 in such a direction so as to engage the hook 1411 with the locking protrusion 111.

Figure 6:
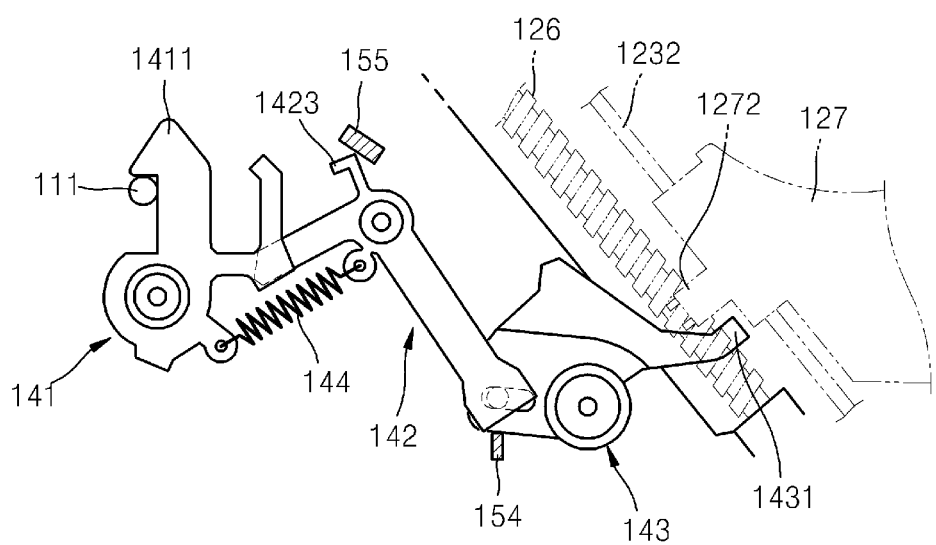
FIGS. 6 through 8 are drawing illustrating examples of operations of a lock releasing unit.
Figure 7:
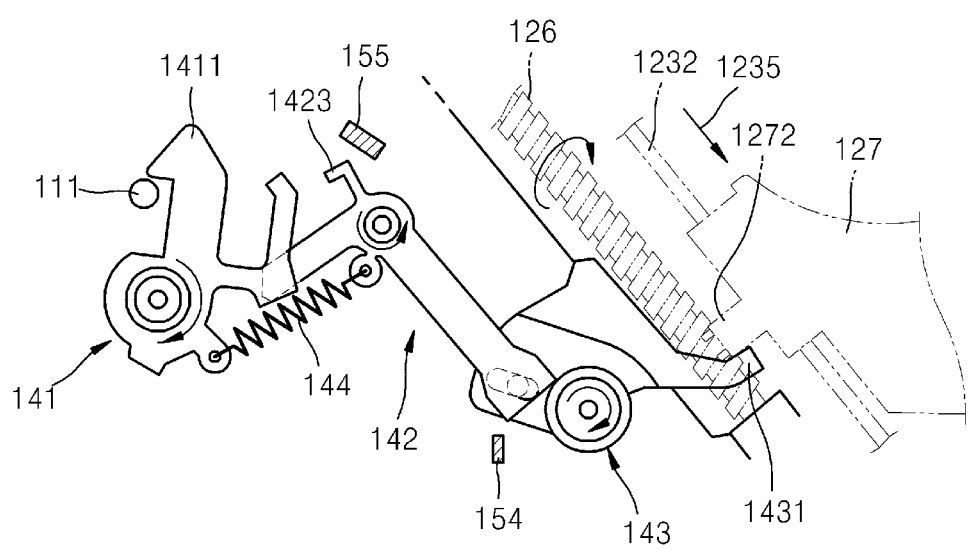
Figure 8:
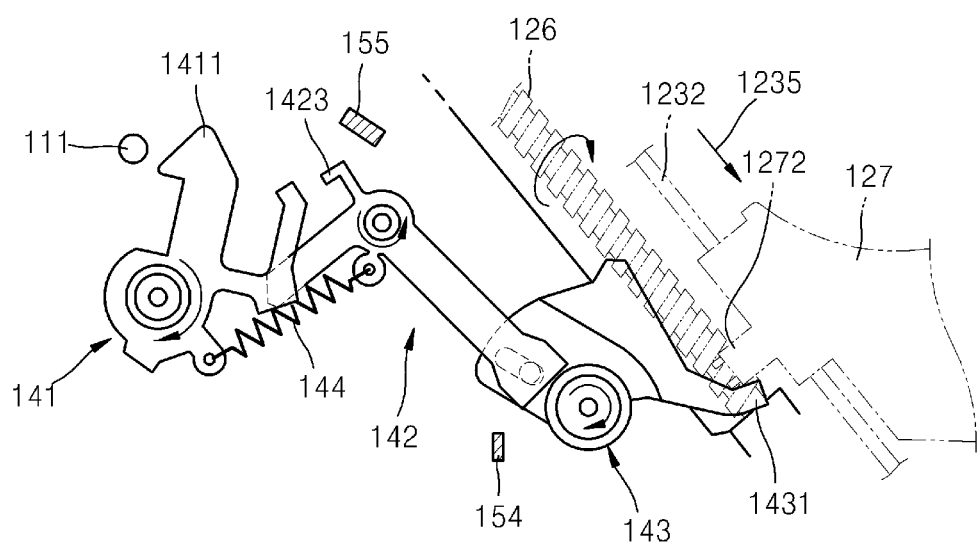

FIGS. 6 through 8 are drawings illustrating examples describing operations of a lock releasing unit.

Referring to FIG. 6, a tray (e.g., tray 120 of FIG. 2) is inserted into the main chassis (e.g., main chassis 110 of FIG. 2), and thus the hook 1411 is engaged with the locking protrusion 111. The current state illustrated in FIG. 6 of the lock releasing unit 140 is identical to an initial state of the lock releasing unit 140 as described above. In other words, the link unit 143 engages the stopper 154, the position defining unit 1423 engages the frame 155, and the spring 144 applies an elastic force to the lock lever unit 141 in a counterclockwise direction of FIG. 6 so as to bias the hook 1411 towards an engagement position in which the hook 1411 engages the locking protrusion 111. Accordingly, the lock lever unit 141 is inhibited or otherwise prevented from rotating in a clockwise direction of FIG. 6. The hook 1411 may engage with the locking protrusion 111 in an initial state. As a result, the tray (e.g., tray 120 of FIG. 2) may be inserted in the main chassis (e.g., main chassis 110 of FIG. 2) in a locked state. In a locked state, the tray 120 may be inhibited from unintentionally ejecting from the main chassis 110.

In this initial state, the driving force transmitting unit 1433 does not contact the lead screw 126, and the interfering unit 1431 does not contact the feeding guide 1272 of the pickup base 127. The pickup base 127 receives a rotation force of the lead screw 126 via the feeding guide 1272 and moves back and forth in a straight line in a radial direction of a disk to allow a pickup unit (e.g., the optical pickup unit 1271 of FIG. 1) to read out data stored in the disk or write data to the disk. Because the pickup base moves along a straight line in a radial direction of a disk so as to allow read and write operations to and from a disk, the position of the pickup base 127 is not limited to the position shown in FIG. 6. However, as the optical pickup unit (e.g., optical pickup unit 1271 of FIG. 1) is reading data from or writing data to the disk, the feeding guide 1272 of the pickup base 127 does not contact the interfering unit 1431. In other words, even if the pickup base 127 is positioned at an outermost point of relating to point substantially along the outer circumference of a disk, the feeding guide 1272 of the pickup base 127 does not contact the interfering unit 1431.

Referring to FIG. 7, when a lock releasing signal is input, a control unit (not shown) drives a step motor (e.g., step motor 125 of FIG. 2) that in turn rotates the lead screw 126 so as to move the pickup base 127 in a direction indicated by an arrow 1235 by the lead screw 126. As the feeding guide 1272 engages the interfering unit 1431 which thereby transfers a rotational force to the link unit 143. Accordingly, the link unit 143 rotates in a clockwise direction. The link unit 143 transfers a rotational force to the connecting unit 142 which is operatively connected to the link unit 143. Thus, the connecting unit 142 rotates in a counterclockwise direction. In turn, the connecting unit 142 transfers a rotational force to the lock lever unit 141 which is operatively connected to the connecting unit 142. Thus, the lock lever unit 141 rotates in the clockwise direction. Therefore, the link unit 143 is separated from the stopper 154, and the position defining unit 1423 is separated from the frame 155.

Referring to FIG. 8, a step motor (e.g., step motor 125 of FIG. 2) further rotates the lead screw 126. As the step motor further rotates the lead screw 126, rotation of the link unit 143 is transmitted to the lock lever unit 141 via the connecting unit 142. Thus, the hook 1411 is released from the locking protrusion 111. At this point, the spring 144 is maximally extended. Therefore, the tray 120 is unlocked from the main chassis 110 (refer to FIG. 1) and therefore ejected from the main chassis 110.

Figure 9:
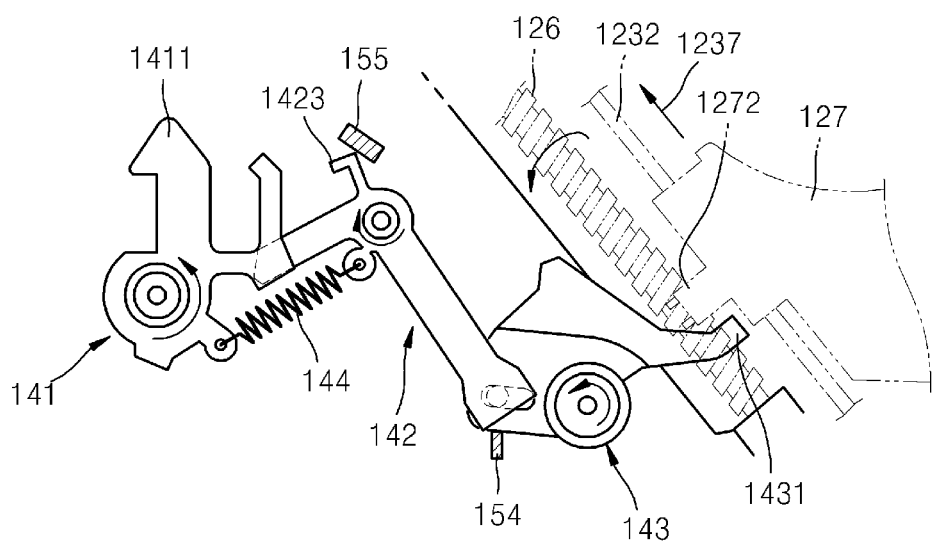
FIG. 9 is a drawing illustrating an example of an operation of returning a lock releasing unit to an initial position.

FIG. 9 is a diagram illustrating an example of an operation of returning a lock releasing unit to an initial position.

FIG. 9 shows an operation for returning the lock releasing unit 140 to the initial position, such that the hook 1411 may engage with a locking protrusion (e.g., locking protrusion 111 of FIG. 1) when a tray (e.g., tray 120 of FIG. 1) is re-inserted into a main chassis (e.g., main chassis 110 of FIG. 1).

To return the lock releasing unit 140 to the initial position, a control unit (not shown) drives a step motor (e.g., step motor 125 of FIG. 2) to rotate in an opposite direction than the direction used to eject the tray. For example, the step motor may rotate in a counterclockwise direction. The pickup base 127 moves in the direction indicated by an arrow 1237 as rotation force of the lead screw 126 is transmitted via the feeding guide 1272. At this point, as the force applied by the feeding guide 1272 is removed and elastic force of the spring 144 is applied, the lock lever unit 141 rotates in a counterclockwise direction. Accordingly, the lock lever unit 141 transfers a rotational force to the connecting unit 142 which is operatively connected to the lock lever unit 141. The connecting unit 142 thus rotates in a clockwise direction. In turn, the connecting unit 142 transfers a rotational force to the link unit 143 which is operatively connected to the connecting unit 142. The link unit 143 thus rotates in a counterclockwise direction. The rotations of the lock lever unit 141, the connecting unit 142, and the link unit 143 are stopped when the position defining unit 1423 engages the frame 155 and the link unit 143 engages the stopper 154. A current state of the lock releasing unit 140 is the initial position of the lock releasing unit 140 shown in FIG. 6. In other words, the lock releasing unit is brought back to its initial state and the tray (e.g., tray 120 of FIG. 1) is in a locked position relative to the main chassis (e.g., main chassis 110 of FIG. 1).

Disk drives as described in the above examples may be included in an electronic device. As a non-exhaustive illustration only, an electronic device described herein may refer to mobile devices such as a digital camera, a portable game console, a portable/personal multimedia player (PMP), a portable lap-top PC, and devices such as a desktop PC, a high definition television (HDTV), an optical disc player, a set top box, and the like capable of wireless communication or network communication consistent with that disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A disk drive comprising:
a main chassis;
a tray, on which a disk is to be removably mounted, the tray being installed to slide into/out of the main chassis, and including a pickup transporting unit configured to move a pickup base, on which an optical pickup unit is installed, back and forth in a radial direction of the disk; and
a lock releasing unit which is arranged on the tray, is driven by receiving a driving force of the pickup transporting unit, and releases a lock of the tray from the main chassis;
wherein the lock releasing unit comprises a lock lever unit, a link unit, and a connecting unit which are rotatably installed on the tray.

2. The disk drive of claim 1, wherein the lock lever unit includes a hook which is to be engaged with a locking protrusion which is arranged on the main chassis, the link unit includes an interfering unit which receives a driving force from the pickup base, and the connecting unit is connected to the lock lever unit and the link unit, and rotates the lock lever unit by transferring to the lock lever unit a force which is based on a rotation force which the connecting unit receives from the link unit.

3. The disk drive of claim 2, wherein the interfering unit receives a driving force of the pickup transporting unit by engaging a feeding guide which connects the pickup base to a lead screw.

4. The disk drive of claim 3, wherein the pickup transporting unit includes a servo motor and the lead screw, the servo motor drives the lead screw by transferring a driving force to the lead screw.

5. The disk drive of claim 2, wherein the lock releasing unit further comprises a spring which is fixed to the lock lever unit and the connecting unit and which applies an elastic force in a direction in which the hook is engaged with the locking protrusion.

6. The disk drive of claim 2, further comprising a stopper which is arranged on the tray so as to define an initial position of the lock releasing unit, the stopper being arranged so as to engage the link unit in the initial position.

7. The disk drive of claim 6, further comprising a position defining unit which defines the initial position of the lock releasing unit, the position defining unit being installed on the connecting unit, and contacting a frame of the tray if the link unit is engaging the stopper.

8. The disk drive of claim 6, wherein the lock releasing unit further comprises a spring which is fixed to the lock lever unit and the connecting unit and applies an elastic force in a direction in which the hook engages the locking protrusion.

9. The disk drive of claim 3, further comprising a stopper which is arranged on the tray so as to define an initial position of the lock releasing unit, the stopper being arranged so as to engage the link unit in the initial position.

10. The disk drive of claim 9, further comprising a position defining unit which defines the initial position of the lock releasing unit, the position defining unit being installed on the connecting unit, and contacting a frame of the tray if the link unit is engaging the stopper.

11. An electronic device, the electronic device including the disk drive of claim 1.

12. The electronic device of claim 11, wherein the electronic device is one of a portable game console, a portable/personal multimedia player (PMP), a portable lap-top PC, a desktop PC, a game console, a high definition television (HDTV), an optical disc player/recorder, and a set top box.

13. A disk drive comprising:
   a main chassis;
   a tray, on which a disk is to be removably mounted, which is installed to slide into/out of the main chassis, the tray including a pickup base, on which an pickup unit is installed, a pickup transporting unit which includes a lead screw, which is rotated by a step motor, and a feeding guide, which connects the lead screw and the pickup base; and
   a lock releasing unit which is arranged on the tray, is driven by receiving a driving force of the step motor via the feeding guide, and releases a lock of the tray from the main chassis.

14. The disk drive of claim 13, wherein the lock releasing unit comprises:
   a lock lever unit which is rotatably installed on the tray and that includes a hook which is to be engaged with a locking protrusion which is arranged on the main chassis;
   a link unit which is rotatably installed on the tray and comprises an interfering unit which engages with the feeding guide; and
   a connecting unit which is rotatably installed on the tray, is connected to the lock lever unit and the link unit, and rotates the lock lever unit by transferring to the lock lever unit a force that is based on a rotation force that the connecting unit receives from the link unit.

15. The disk drive of claim 14, wherein the lock releasing unit comprises a spring which is fixed to the lock lever unit and the connecting unit and that applies an elastic force in a direction in which the hook is engaged with the locking protrusion.

16. The disk drive of claim 14, further comprising a stopper which is arranged on the tray so as to define an initial position of the lock releasing unit, the stopper being arranged so as to engage the link unit in the initial position.

17. The disk drive of claim 16, further comprising a position defining unit which defines the initial position of the lock releasing unit, the position defining unit being installed on the connecting unit, and contacting a frame of the tray if the link unit is engaging the stopper.

18. The disk drive of claim 15, further comprising a stopper which is arranged on the tray so as to define an initial position of the lock releasing unit, to stopper being arranged so as to engage the link unit in the initial position.

19. The disk drive of claim 18, further comprising a position defining unit which defines the initial position of the lock releasing unit, the position defining unit being installed on the connecting unit, and contacting a frame of the tray if the link unit is engaging the stopper.

20. A method of releasing lock of a tray from a main chassis, comprising:
   configuring a lock releasing unit to comprise a lock lever unit;
   configuring the lock lever unit to be rotatably installed on the tray;
   configuring a hook in the lock lever unit to be combined with a locking protrusion arranged on the main chassis;
   rotatably installing a link unit on the tray;
   configuring an interfering unit comprised in the link unit to receive driving force from a pickup base;
   rotatably installing a connecting unit on the tray and operatively connecting the connecting unit to the lock lever unit and the link unit;
   configuring the connectin unit to rotate the lock lever unit using a rotation force of the link unit;
   driving the pickup base;
   releasing a lock of the tray from the main chassis; and
   returning the lock releasing unit to the initial position thereof.

21. The method of claim 20, wherein, during the driving of the pickup base, the pickup base is moved in the outer circumferential direction of the disk by moving a feeding guide operatively connected to the lead screw by driving the step motor and rotating a lead screw connected to the step motor according to a lock releasing signal.

22. The method of claim 21, wherein, during the releasing of the lock of the tray, the link unit rotates as the feeding guide engages with the interfering unit, and due to the rotation of the link unit, the connecting unit and the lock lever unit rotate, thereby releasing the hook from the locking protrusion.

23. The method of claim 22, wherein, during the returning of the lock releasing unit to the initial position thereof, the lead screw reversely rotates as the step motor reversely rotates,
   the feeding guide is separated from the interfering unit, and
   the link unit is returned to the initial position due to recovery of the spring.

* * * * *